United States Patent
Cheng

(10) Patent No.: US 8,628,117 B1
(45) Date of Patent: Jan. 14, 2014

(54) PUSH-FIT RING-SEAL JOINT STRUCTURE FOR PLASTIC PIPES

(75) Inventor: Hong-Kuo Cheng, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 13/596,335

(22) Filed: Aug. 28, 2012

(51) Int. Cl.
*F16L 17/00* (2006.01)

(52) U.S. Cl.
USPC .......................................... 285/110; 285/231

(58) Field of Classification Search
USPC ............... 285/374, 95, 111, 110, 223, 231; 277/615, 616
See application file for complete search history.

(56) References Cited

U.S. PATENT DOCUMENTS 4,133,563 A * 1/1979 Yamazaki ...................... 285/231
4,275,909 A * 6/1981 Yoshizawa et al. ........... 285/110

FOREIGN PATENT DOCUMENTS

| FR | 2546258 A1 | * | 11/1984 | ............... E03F 3/04 |
| JP | 53011271 A | * | 2/1978 | ............... F16L 17/02 |
| JP | 54043314 A | * | 4/1979 | ............... F16L 21/02 |
| JP | 54099218 A | * | 8/1979 | ............... G01L 21/02 |

OTHER PUBLICATIONS

Machine translation of FR 2546258.*

* cited by examiner

*Primary Examiner* — Aaron Dunwoody
(74) *Attorney, Agent, or Firm* — Rosenberg, Klein & Lee

(57) ABSTRACT

The instant disclosure relates to a push-fit ring-seal joint structure for plastic pipes. For the joint structure, a lip portion tapers away from the pipe outlet, while a throat portion tapers toward the pipe outlet. The joint structure allows the angular deflection to be increased by three or four times versus the conventional push-fit joint, while maintaining excellent sealing and pressure rating. By the unique design of the joint structure, the structural flexibility of pipe connection can be increased. When there is ground movement due to land subsidence or earthquake or adjustment in pipe route, the coupled pipe can maintain excellent sealing and pressure rating. Therefore, the joint structure of the instant disclosure indeed has novelty and industrial applicability.

6 Claims, 3 Drawing Sheets

PUSH-FIT RING-SEAL JOINT STRUCTURE FOR PLASTIC PIPES

BACKGROUND OF THE INVENTION

1. Field of the Invention

The instant disclosure relates to a push-fit ring-seal joint structure for plastic pipes; more particularly, to an improved joint structure that has an inwardly tapered lip portion and an immediately followed throat portion having two continuously adjacent stepped V-shaped ridges, where the outer ridge toward the lip portion defines an O-ring receiving region, while the inner ridge defines a deflection tolerating zone, thus allowing the instant joint structure to accommodate angular deflection up to three or four times greater than the conventional push-fit joint, while providing excellent sealing and pressure rating.

By using the joint structure of the instant disclosure, particularly through its unique structural design, greater pipe deflection can be tolerated. Therefore, when encountering ground movement (e.g. ground subsidence, earthquake) or adjustment of pipe route during installation, the joint structure of the instant disclosure can still maintain excellent sealing and pressure rating.

2. Description of Related Art

The applicant of the instant disclosure is the largest PVC pipe manufacturer in Taiwan with excellence in quality. Various types of plastic pipes developed by the applicant have been used widely in the domestic market. The popularity derives from the unique design of the pipes itself, along with other attributes such as high pressure rating, excellent sealing, and ease in installation. Particularly in the advancement and upgrade of connecting techniques of the PVC pipes, the applicant has made many contributions and provided numerous technological breakthroughs.

However, particularly after the deadly 921 earthquake (also known as the September twenty first Jiji Earthquake) in Taiwan, the plastic pipes that were put in service are in need for upgrade. Besides better impact resistance, the plastic pipe, particularly its pipe joints, needs to be able to maintain effective sealing and withstand high water pressure during ground movements due to earthquakes or adjustment of route during installation.

Please refer to FIG. 1, which shows a longitudinal cross sectional view of a conventional push-fit joint 20 for a plastic pipe. The inner circumferences of a lip portion 30 and a throat portion 40 thereof are smooth and substantially cylindrical. When another pipe having a plain spigot (the male pipe) is received by the conventional push-fit joint 20, very small clearances exist between the two pipes, such that the spigot end is snugly received therein as in a socket. For curved pipe route, the joining of the male and female ends of the pipes becomes more difficult. If the coupling is done forcibly, a rubber seal 50 can easily be jammed and cause leakage. Another limitation is even if the pipes are successfully jointed, the allowable angular deflection, represented by α in FIG. 2, is approximately 3°~4°. In addition, as shown in FIG. 2, the portion where the lip portion 30 merges into the throat portion 40 is prone to be damaged. Further still, if the pressure distribution over the rubber seal 50 is not uniform, the pipe joint is subject to leakage. If the construction site is poorly maintained, leakage problems due to poor field handling are even more likely to occur.

To provide ease of laying the pipe work, the conventional push-fit joint 20 is normally designed such that some clearances exist between the inner circumference of the lip portion 30 and the spigot of the inserted pipe. The rubber seal 50 is elastic and has a hardness value ranging from 50~65 shore A. The shore A scale is used as a measure of hardness in rubbers and ranges from 0 to 100, with 0 being extra soft and 100 being extra hard. However, in practice, after the pipe installation is completed, the rubber seal 50 is often forced out of position by the pressurized fluid. As a result, the conventional push-fit joint tends to loose its sealing ability and is subject to leakage. When the pipe route must be adjusted to fit the terrain, the manner in which the inserted pipe is deflected often creates clearances inside the conventional push-fit joint disproportionally, which increases the likelihood of leakage. As previously mentioned, a large leak can result from the rubber seal 50 being pushed out of position by excessive pressure of the running fluid. To avoid the abovementioned problems, if a smaller clearance is proposed between the two pipes at the lip portion 30, the pipes would become much harder to couple, taking more time and effort. In particular, when the pipe route needs to be adjusted because of the terrain, the proposed clearance reduction would only exacerbate the coupling difficulty. If the joining of pipes is done forcibly, the rubber seal 50 would be pushed out of position, as the conventional push-fit joint 20 looses its sealing ability and allows leakage to occur. Likewise, if a harder rubber seal 50 is used to prevent the displacement from happening, the coupling of the pipes would be more difficult and the sealing of the pipes would not be as effective.

Moreover, Taiwan (where the Applicants reside) is located in an area where seismic activity happens frequently. Ground movement associated with an earthquake often causes damages at pipe joints where leakage would occur.

SUMMARY OF THE INVENTION

Based on past experience in pipe installations, research, and testing, the inventor presents a push-fit ring-seal joint structure for plastic pipe, which can effectively improve the shortcomings described above. In particular, the allowable deflection (α in FIG. 2) of the received pipe (male pipe) can be increased up to three or four times that of the existing designs. Even during deflection, the joint structure of the instant disclosure can still maintain excellent sealing ability and pressure rating. While research and development work is being done on the pipe connecting techniques, the inventor has also developed an embedded rubber seal to work cooperatively with the joint structure. The rubber seal of the instant disclosure is structurally reinforced, which can prevent from being displaced due to excessive fluid pressure. Meanwhile, the pipes can be coupled with ease and excellent sealing ability can be provided. When the improved rubber seal and the plastic pipe having the joint structure of the instant disclosure are used together, excellent sealing ability and higher pressure rating can be achieved. The tightness of the plastic pipe itself is also adjustable.

As previously mentioned, for the joint structure of the instant disclosure, the allowable deflection can be increased by up to three or four times versus the conventional design, while maintaining excellent sealing ability and pressure rating.

The joint structure of the instant disclosure features a lip portion that tapers inward away from the pipe outlet and a throat portion that tapers outward toward the pipe outlet, for accommodating angular deflection up to three or four times versus the existing design.

The instant disclosure also provides an embedded rubber seal to work cooperatively with the joint structure. The improved dual lips rubber seal has a gap formed in between its lips for receiving a rigid gasket. The rigid gasket increases the structural strength of the rubber seal. Thereby, the plastic pipe having the joint structure of the instant disclosure can have excellent sealing ability and is capable of withstanding higher fluid pressure.

The tightness of the plastic pipe itself is also adjustable. For further understanding of the characteristics and technical contents of the instant disclosure, and to show the instant disclosure indeed satisfies the criteria in obtaining a patent, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENT

Figure 1:
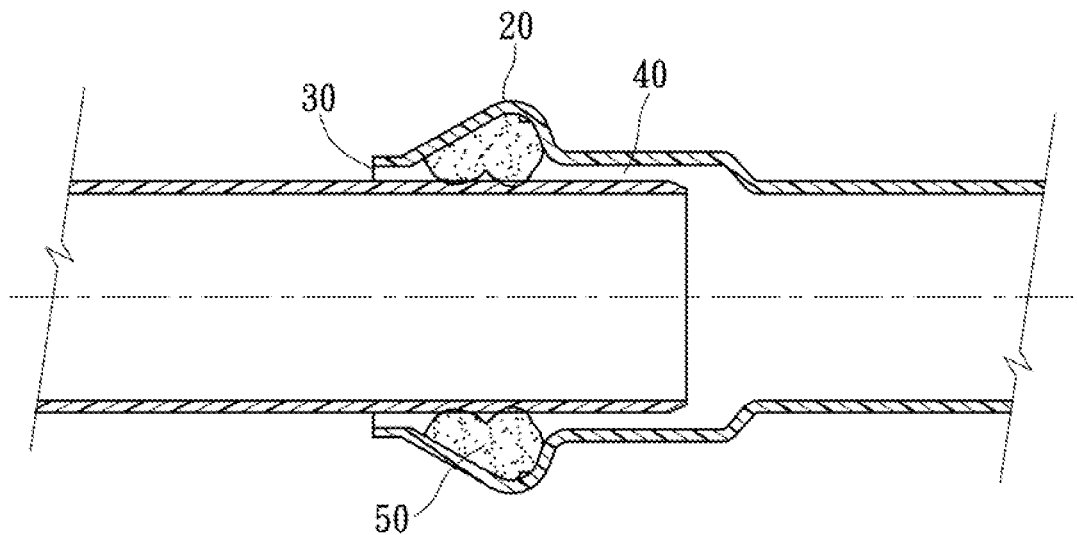
FIG. 1 is an axial sectional view showing a conventional push-fit joint of the plastic pipe.
Figure 3:
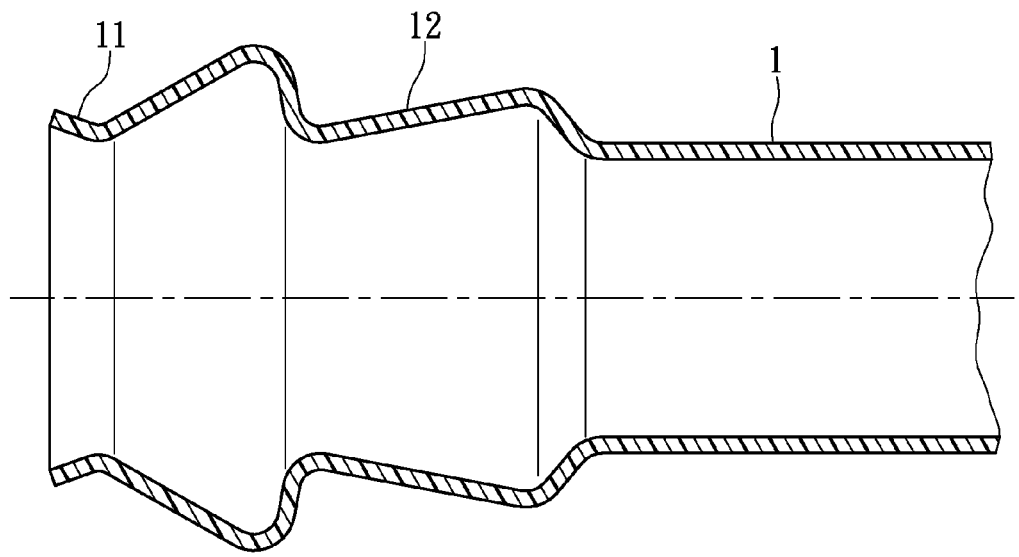
FIG. 3 is an axial sectional view of a joint structure of the plastic pipe of the instant disclosure.
Figure 4:
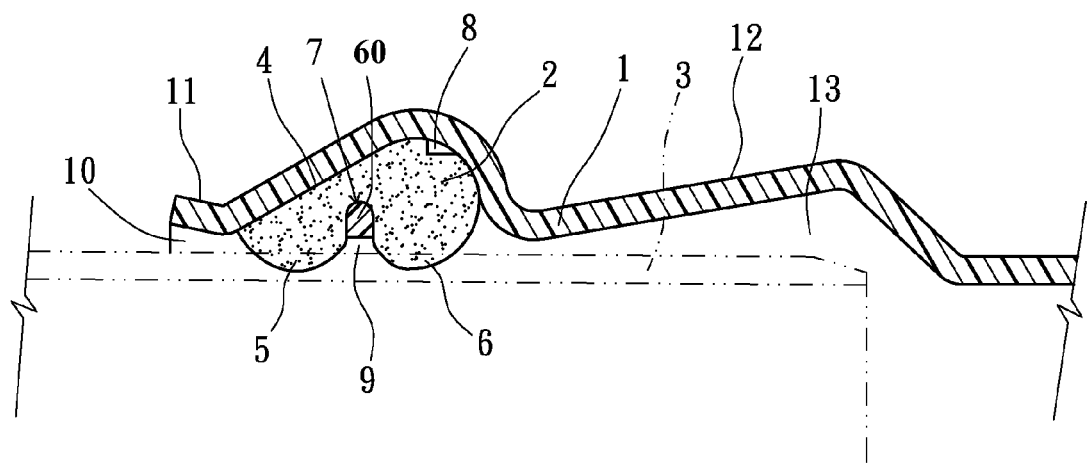
FIG. 4 is a sectional view of a dual lips rubber seal embedded in the joint structure of the instant disclosure.
Figure 5A:
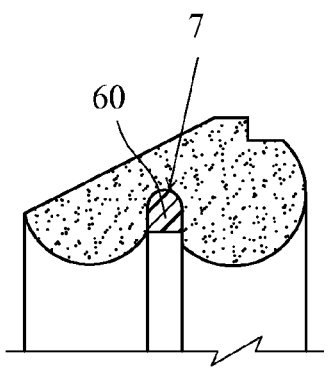
FIGS. 5A~5F show various exemplary cross-sections of a rigid gasket embedded in the dual lips rubber seal of the instant disclosure, where the cross-section may be U-shaped, a semi-circle, a circle, a rectangle, a square, or a trapezoid.
Figure 5B:
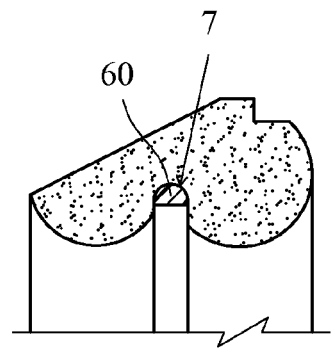
Figure 5C:
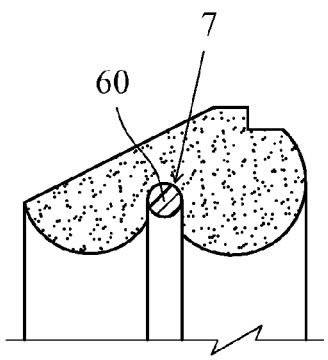
Figure 5D:
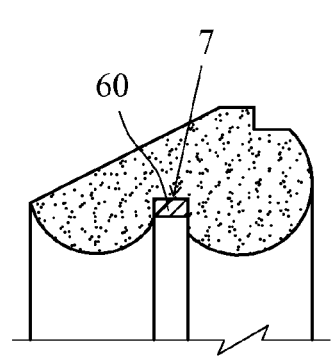
Figure 5E:
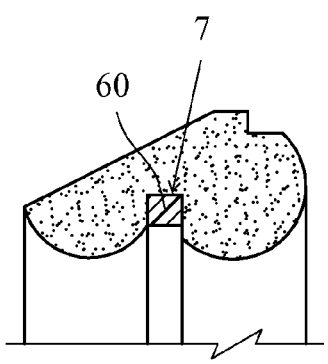
Figure 5F:
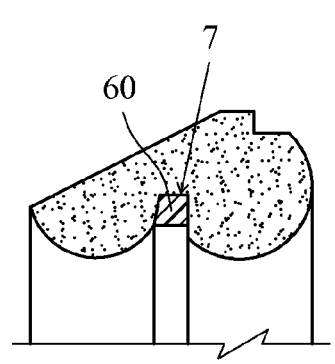

Please refer to FIG. 3, which shows an axial sectional view of a push-fit ring-seal joint structure 1 for plastic pipes of the instant disclosure. In comparing to FIG. 1, the main difference is as follows. The inner circumferences of the lip portion 30 and the throat portion 40 of the conventional push-fit joint 20 are smooth and substantially cylindrical. However, for a lip portion 11 of the joint structure 1 of the instant disclosure, the lip portion 11 is inwardly tapered away from the pipe outlet. Such structural modification is also illustrated in FIG. 4. Furthermore, for a throat portion 12, which includes a V-shaped outer ridge for receiving a dual lips rubber seal 2 and a V-shaped inner ridge behind the dual lips rubber seal 2, the two continuously adjacent stepped V-shaped ridges are outwardly tapered toward the pipe outlet. In other words, the joint structure 1 of the instant disclosure has substantially two V-shaped portions. As previously mentioned, the lip portion 11 tapers away from the pipe outlet, while the throat portion 12 tapers toward the pipe outlet.

Figure 2:
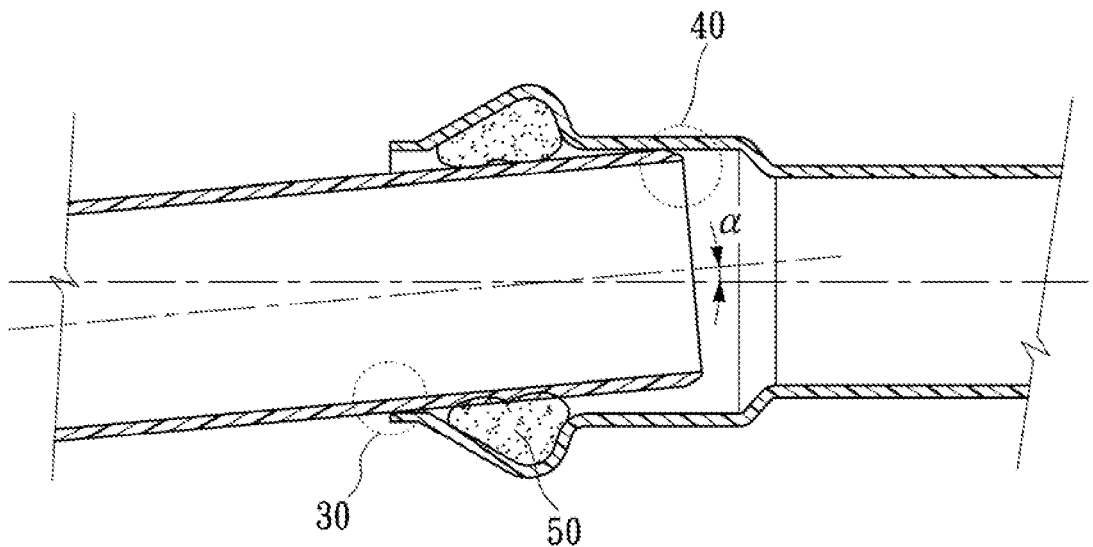
FIG. 2 is an axial sectional view of allowable angular deflection α by the received pipe inside the conventional push-fit joint of the plastic pipe.

Please refer back to FIG. 3. Once the conventional rubber seal 50 is embedded in the joint structure 1, and after a male end 3 of a pipe to be jointed is received by the joint structure 1, the allowable angular deflection (a in FIG. 2) of the received pipe can be increased by up to three or four times greater than the conventional push-fit joint.

Therefore, even in special circumstances, such as uneven/rolling terrain or land deformation due to earthquakes, the increase in the allowable angular deflection by the joint structure 1 of the instant disclosure can prevent leakage or pipe ruptures. Even in those special circumstances, the plastic pipe having the joint structure 1 of the instant disclosure can maintain excellent sealing and pressure rating that the pipe with conventional push-fit joint would perform in standard conditions.

Please refer back to FIG. 4, which is a partial axial sectional view for the joint structure 1 embedded with the dual lips rubber seal 2 of the instant disclosure. As previously mentioned, the lip portion 11 is inwardly tapered away from the pipe outlet, while the throat portion 12 is outwardly tapered toward the pipe outlet. Thereby, when the male end of the other pipe is received by the joint structure 1, the allowable angular deflection (α in FIG. 2) for the received pipe can be three or four times greater than in the conventional push-fit joint. The dual lips rubber seal 2 has a sloped surface 4. The contacting portion of the dual lips rubber seal 2 against the received pipe is divided into a rounded first lip portion 5 and a rounded second lip portion 6 with a groove 7 formed therebetween. The groove 7 is used to receive a rigid gasket 60 (not shown). The first lip portion 5 merges with one end of the sloped surface 4. The second lip portion 6 extends away from the received pipe and forms a right-angled portion 8 with opposite end of the sloped surface 4.

When the pipes are jointed, a gap 10 is formed between the tapered lip portion 11 and the male end 3 of the received pipe. A gap is also formed between the right-angled portion 8 of the dual lips rubber seal 2 and the inner surface of the joint structure 1. Further still, a gap 9 is formed between the groove 7 and the male end 3 of the received pipe. A gap 13 is also formed between the tapered throat portion 12 and the male end 3 of the received pipe. The first and second lip portions 5, 6 of the dual lips rubber seal 2 rest tightly on the sealing surface of the male end 3 of the received pipe, providing a double-sealed effect. Meanwhile, the deformed portions of the first and second lip portions 5, 6 can be pushed into filling the gaps, which make the dual lips rubber seal 2 to fit tighter on the sealing surface of the received pipe.

Moreover, as shown in FIG. 4, by disposing the rigid gasket 60 in the groove 7, the dual lips rubber seal 2 can be seated more securely, to reduce the risk of being displaced by the pressurized fluid. The enhanced stability associated with the dual lips rubber seal 2 means better sealing and pressure rating for the plastic pipe having the joint structure 1 of the instant disclosure. The tightness of the plastic pipe can also be adjusted.

Please refer to FIGS. 5A~5F, which show various exemplary cross sections of the rigid gasket 60 for disposing in the groove 7. The shape of the cross section may be U-shaped, semi-circular, circular, rectangular, square, trapezoidal, etc. The rigid gasket 60 having its cross section with any of the above shapes can increase the structural stability of the dual lips rubber seal 2. Thereby, better sealing and pressure rating can be achieved by the plastic pipe having the joint structure 1 of the instant disclosure.

Based on the above, the joint structure of the instant disclosure has the following advantages. The tapered lip portion allows the modified joint structure to have greater structural flexibility. Even in special circumstance, such as laying the pipe work on uneven/rolling terrain or land deformation due to earthquakes, the plastic pipe having the joint structure of the instant disclosure can maintain excellent sealing and pressure rating. For installation, the plastic pipe having the joint structure of the instant disclosure can be coupled quickly with ease. Also, the plastic pipe having the joint structure of the instant disclosure is designed to eliminate the problems of longitudinal variation due to thermal expansion and contraction. When the fluid pressure is too high, the dual lips rubber seal would remain in position to prevent leakage. Moreover, the dual lips rubber seal is reinforced with the rigid gasket. Thus, the dual lips rubber seal has better structural stability, which allows the plastic pipe with the joint structure of the instant disclosure to have excellent sealing and pressure rating.

The inventor believes the examiner would deem the joint structure and the dual lips rubber seal of the instant disclosure to possess industrial applicability, novelty, and non-obviousness for meeting the stringent patentability requirements. The preferred embodiment of the instant disclosure has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A flexible push-fit ring-seal joint structure, on an outlet of a plastic pipe, the flexible push-fit ring-seal joint structure comprising:
    a lip portion defined at the outlet, wherein an inner surface of the lip portion tapers inward away from the outlet, a throat portion adjacent to the lip portion,
    wherein the throat portion comprises a V-shaped outer ridge and a V-shaped inner ridge, the V-shaped inner ridge is adjacent to the V-shaped outer ridge,
    wherein the V-shaped outer ridge defines an O-ring receiving region and the V-shaped inner ridge defines a deflection tolerating zone,
    wherein the inner surfaces of the V-shaped inner ridge and the V-shaped outer ridge taper outward toward the outlet, a dual lips rubber seal disposed into the V-shaped outer ridge,
    wherein the dual lips rubber seal is divided into a rounded first lip portion and a rounded second lip portion with a groove formed therebetween wherein the dual lips rubber seal has a sloped surface,
    wherein the first lip portion merges with one end of the sloped surface and the second lip portion forms a right-angled portion with opposite end of the sloped surfaced, wherein a first gap is formed between the right-angled portion and the inner surface of the joint structure.

2. The flexible push-fit ring-seal joint structure of claim 1, wherein a male end of a received pipe forms a second gap between the tapered lip portion and a male end of a received pipe.

3. The flexible push-fit ring-seal joint structure of claim 2, wherein a third gap is formed between the groove and the male end of a received pipe.

4. The flexible push-fit ring-seal joint structure of claim 3, wherein a fourth gap is formed between the tapered throat portion and the male end of a received pipe.

5. The flexible push-fit ring-seal joint structure of claim 1, wherein the dual lips rubber seal further comprises a rigid gasket positioned in the groove.

6. The flexible push-fit ring-seal joint structure of claim 5, wherein the rigid gasket comprises one of a U-shaped, semicircular, circular, rectangular, square and trapezoidal cross sectional shape.

* * * * *